INVENTOR.
ROGER NEWMAN
BY
ATTORNEY

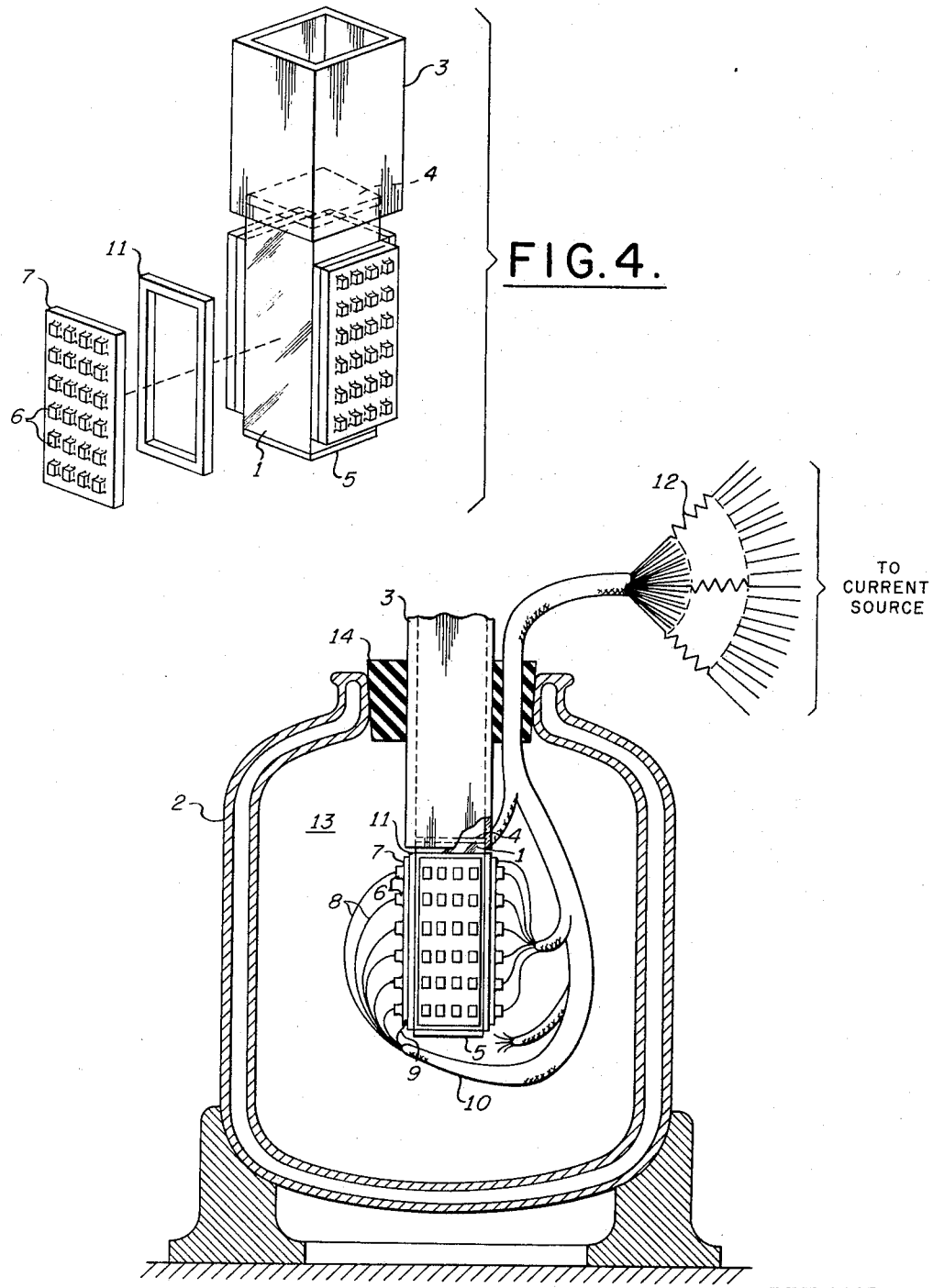

3,316,500
SOLID-STATE COHERENT LIGHT SOURCE
Roger Newman, Wayland, Mass., assignor to Sperry Rand Corporation, Great Neck, N.Y., a corporation of Delaware
Filed Sept. 11, 1962, Ser. No. 222,847
10 Claims. (Cl. 331—94.5)

The present invention generally relates to coherent light sources and, more particularly, is concerned with a source of such type comprising a solid state pump and a solid state laser.

Solid-state lasers are well-known in the art for producing output beams of coherent light. In conventional lasers, however, the ions of the active element are "pumped" or excited into relatively high energy levels by irradiation from non-solid state light sources such as xenon or mercury gas discharge lamps. The excited ions decay non-radiatively from the relatively high levels toward a lower energy level which is metastable. Further decay from the metastable energy level results in a fluorescence or "lasing" of coherent light.

There are many significant disadvantages inherent in the prior art excitation techniques. Xenon or mercury pumped lasers operate with very poor efficiencies of about 1% or less, average power radiation being limited to less than 1 watt. Gas discharge lamps are relatively high temperature operating devices which fact presents a design problem in efficiently directing their light radiations into laser crystals operating at super cooled temperatures. Special optical systems often are resorted to in order to adapt the conventional high temperature pumps for use with super cooled laser crystals.

The absorption bands of laser crystals are not well matched to the radiation spectra of conventional pumps. Consequently, there is a serious degradation of the coupling efficiency between the laser pump and the laser crystal itself. Moreover, only a small fraction of the absorbed energy results in the desired coherent light fluorescence. Many of the energy level transitions through which the excited laser ions decay are non-radiative and produce no fluorescence. A major improvement in over-all laser efficiency would be achieved if the laser ions were excited directly into the energy level producing lasing action provided that the terminal state of the fluorescence is an excited state of the ion.

It is a principal object of the present invention to provide a solid-state coherent light source characterized by high efficiency.

Another object is to provide a solid-state laser having a solid state pump whose radiation spectra is concentrated within the absorption band for direct laser action.

A further object is to provide a solid-state integrally mounted laser crystal and laser pump.

Another object is to provide a laser crystal having a pump light source operative substantially at the same temperature as the laser crystal.

An additional object is to provide a laser crystal and laser pump combination characterized by high coupling efficiency.

A further object is to provide a solid-state laser device characterized by increased power output and low dissipation.

These and other objects of the present invention, as will appear from a reading of the following specification, are accomplished in a preferred embodiment by the provision of forward-biased gallium arsenide diodes for pumping a trivalent neodymium doped calcium tungstate laser directly into the lasing energy level. The pumping energy is derived from the recombination radiation emitted by the forward-biased gallium arsenide diodes. The diodes are attached directly to the laser crystal to maximize the coupling of the recombination radiation into the crystal. No optical systems are involved for focusing, directly or otherwise conserving the non-coherent excitation energy.

There is nearly total conversion of electrical biasing energy into light by the gallium arsenide diodes. It also has been found that the gallium arsenide radiation spectra is very closely matched to the lasing absorption band of the neodymium doped calcium tungstate crystal. That is, the light energy given up by the forward-biased diodes is concentrated into a spectral band closely approximating the particular absorption band of the laser which directly produces lasing action. The wasteful prior art practice is avoided of "over exciting" the laser crystal into unnecessarily high energy levels from which non-radiative energy decay takes place.

For a more complete understanding of the present invention, reference should be had to the following specifications and to the figures of which:

FIG. 4 is a partially exploded view of the laser crystal and solid-state laser pump arranged in accordance with the present invention;

FIG. 5 is a simplified diagram of the device of FIG. 4 after being fully assembled in an illustrative embodiment.

Figure 1:
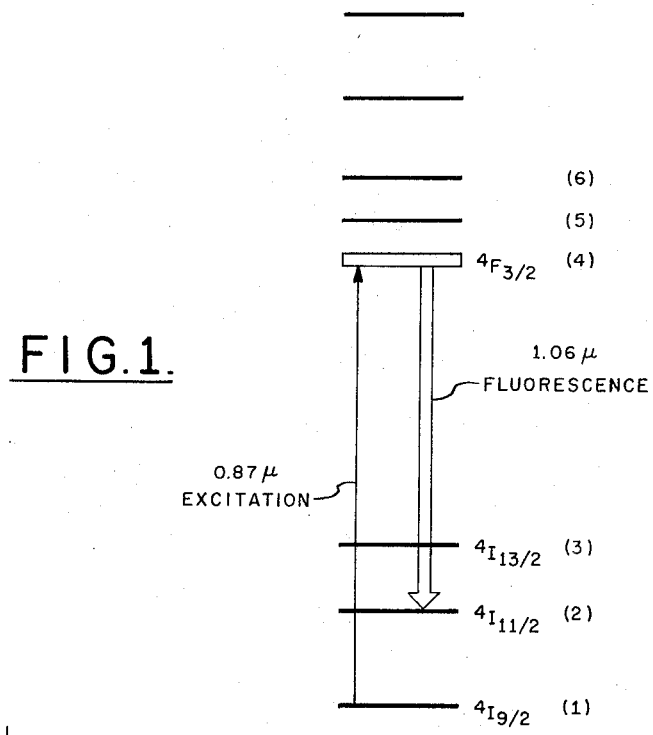
FIG. 1 is a plot of the pertinent energy levels which may be assumed by the ions of a trivalent neodymium doped calcium tungstate crystal.

Referring to the energy level diagram of FIG. 1, ground state level 1 represents the energy level of the trivalent neodymium (Nd$^{3+}$) ion in calcium tungstate (CaWO$_4$) prior to excitation by irradiation from a pump source. Energy level 4 represents the metastable level from which excited neodymium ions decay to directly produce the desired lasing fluorescence. The closely grouped sub-structure of the energy levels depicted in FIG. 1 are not material to the present invention and for that reason are not shown in detail. In conventional lasers, the ions are excited or "pumped" into levels lying above level 4 designated $^4F_{3/2}$. The excited ions then decay non-radiatively to level 4 which is metastable. From this level, there is a fluorescent decay to levels 1, 2 and 3. The fluorescence attributable to the decay from level 4 to level 2 at about 1.06 microns is the desired laser transition.

Figure 2:
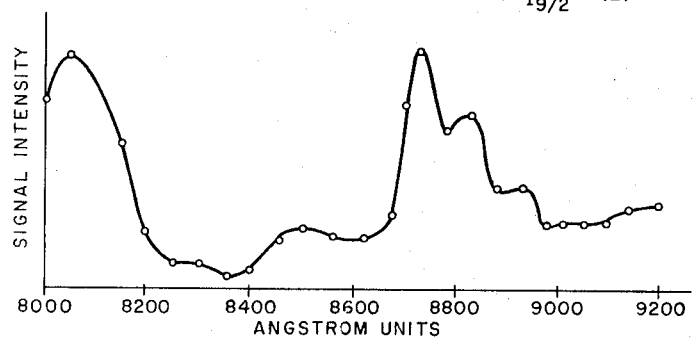
FIG. 2 is a plot of the excitation spectra of the trivalent neodymium doped calcium tungstate crystal operating at 77° K.

In contrast to the prior art techniques, excitation is accomplished in accordance with the present invention by pumping the neodymium ions directly into level 4 by absorption of the transition energy corresponding to the energy difference between levels 1 and 4. It should be observed that the direct pumping into level 4 is the most efficient process in terms of the conversion of absorbed power into laser output power. It has been found that said absorption strongly occurs at 77° K. in the case of neodymium doped calcium tungstate crystal at about 8700 Angstrom units with a full width at half height at about 100 A. FIG. 2 depicts the excitation spectrum in this region. It has been found that absorption at about 8700 A. gives rise to strong fluorescence at 1.06 microns.

When a semiconductor p-n junction is biased in the forward direction, excess carriers are injected into the junction region and into the regions contiguous to it. At any particular bias point, the steady-state concentration of carriers is determined by the balance of the rate of carrier injection and the rate at which the excess carriers disappear through electron-hole recombination. The recombination can occur non-radiatively and/or radiatively. If the recombination is non-radiative, all of the energy given up is converted into photons. If the recombination is radiative, then all or almost all of the carrier energy is converted into photons. In the case where the recombination is both radiative and non-radiative, a portion of the energy is lost non-radiatively through a carrier trapping process while the remainder of said energy is given up as photon radiation.

All three types of recombination, i.e., non-radiative, radiative, and combined radiative and non-radiative processes, proceed simultaneously in a given semiconductor; however, one of the processes usually is dominant. For example, in an alloyed germanium junction at 77° K., non-radiative recombination is the dominant process. Radiative recombination, on the other hand, is dominant in the so-called "direct" semiconductors. Several of the groups III-V compound semiconductors are direct. In particular, gallium arsenide (GaAs) and indium arsenide (InAs) are direct materials.

Figure 3:
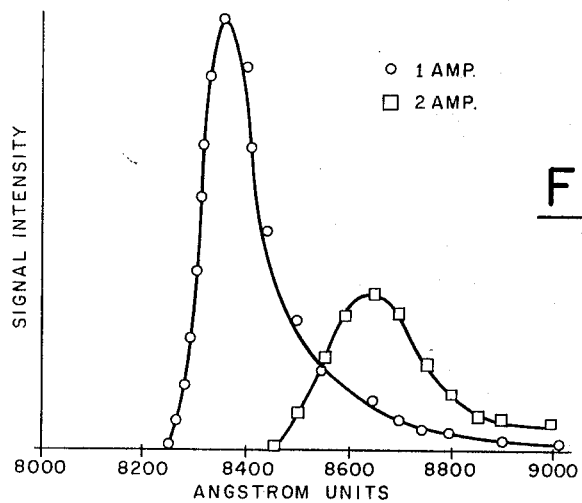
FIG. 3 is a plot of the recombination radiation spectra of alloyed gallium arsenide diodes operating at 77° K.

Measurements made of the recombination radiation produced by forward biased zinc diffused gallium arsenide junctions operated at or near 77° K. indicate that there is a strong peak centered at 1.45 ev. (8600 A.). The position of the peak is a function of the magnitude of the forward-biasing current. This is shown in the plots of FIG. 3 resulting from the application of one ampere and two amperes, respectively, of forward-biasing currents to a representative alloyed junction unit prepared by alloying a Pb-Zn dot onto n type gallium arsenide. Diffused junction units exhibit similar characteristics. An outstanding attribute of the recombination radiation process is the high conversion efficiency involved. The efficiency of conversion of electrical input power (diode forward-biasing power) to radiation output power tends toward unity.

It was previously mentioned that the most efficient pumping wave length of the neodymium calcium tungstate crystal at 77° K. occurs at about 8700 A. with about ±50 A. half power-points. It should be observed that this substantially matches the recombination radiation at 77° K. of the zinc diffused gallium arsenide diodes having a wave length of about 8600 A. with about ±50 A. half power-points. In accordance with the present invention, the dovetailing recombination spectra of the diode and the direct lasing excitation spectra of the crystal are fully exploited by utilizing said diode as a pump for exciting the crystal to provide a solid-state pump and crystal for efficiently converting input electrical energy (diode forward-biasing energy) into output coherent light energy.

In the preferred embodiment of FIG. 5, a rectangular block of neodymium calcium tungstate crystal 1 is suspended within an insulated container 2 (such as a Dewar flask) by means of a hollow rectangular tube 3. Tube 3, in turn, is supported by insulating stopper 14. The inner surfaces of tube 3 are cemented to the surfaces of crystal 1 about end 4 by means of a conventional calorimeter adhesive. Tube 3 merely provides mechanical support for the laser structure suspended within container 2 and does not require the use of any special material; for example, glass or the material made under the trademark Kovar are suitable materials.

Crystal 1 is provided with silvered reflective coatings at ends 4 and 5 in a conventional manner to form the laser cavity for the build-up of coherent light energy. The reflective layer at end 4 is less opaque than the one at end 5 in order that the reinforced coherent light energy may escape through the hollow interior of tube 3.

The remaining four surfaces of crystal 1 receive excitation energy from a plurality of zinc diffused gallium arsenide semiconductive diodes 6. In the disclosed embodiment, the diodes are formed on four blocks of semiconductive material each consisting of 24 diodes. One of the four blocks 7 is shown most clearly in the view of FIG. 4. Each block may be formed in a conventional manner by zinc doping a sheet or wafer of gallium arsenide semiconductive material and then etching the wafer to yield a plurality of individual mesa diode junctions. A separate electrical connection 8 is made to each of the raised surfaces of the individual diode junctions and a common electrical connection 9 is made to the base semiconductive material common to all of the diodes situated on the same block of material. The common electrical connection 9 and the individual connections 8 are brought out of the chamber 2 through a cable 10. Electrical connections are similarly established to each of the remaining three blocks of diodes.

Block 7 of FIG. 4 is sealed by means of ring 11 to the respective surface of crystal 1. Ring 11 may comprise material made under the trademark Kovar. The remaining three blocks of diodes are similarly sealed to the respective surfaces of crystal 1 thereby covering all the exposed surfaces of crystal 1 excepting the two end surfaces 4 and 5. Each of the individual electrical connections to the raised surfaces of the diodes is connected through a respective current balancing resistor 12 to a common biasing current source (not shown). The individual resistors allow for production variations in the individual diodes comprising each block of diodes. The value of each resistor is selected so as to provide a forward-biasing current within the range from about 1 ampere to about 2 amperes for each individual diode.

Flask 2 is filled with liquid nitrogen 13 to maintain the operating temperature of the immersed laser crystal and laser pump assembly at 77° K. Insulated stopper 14 helps in maintaining the temperature of the liquid nitrogen bath and provides support for tube 3 and the electrical excitation cables 10.

In operation, forward-biasing currents are applied simultaneously to all four blocks of gallium arsenide diodes. The magnitude of the biasing currents are adjusted to produce substantially the recombination radiation spectra shown in the plot of FIG. 3. A biasing current of about 2 amperes is preferred because the resulting spectra most closely approximates the direct lasing excitation wave length (8700 A.) of the neodymium doped calcium tungstate crystal to maximize coupling efficiency at the operating temperature of 77° K.

The radiation emitted by the forward-biased diodes is directed with essentially no loss into the body of the crystal to excite the active neodymium ions directly into metastable energy level $^4F_{3/2}$. The excited ions then decay from the metastable energy level, producing the 1.06 micron fluorescence in the process. Said fluorescence builds up along the longitudinal axis of crystal 1 traverse to the reflective films at ends 4 and 5 to a value per permitting the escape of coherent light through the semiopaque film at end 4 and through the hollow interior of rod 3.

It appears that although the recombination radiation spectra of the gallium arsenide diodes closely matches the direct lasing excitation wave length of the neodymium doped calcium tungstate crystal, higher efficiency may be achieved by shifting the emission wave length (8600 A.) of the diodes by about +100 A. to equal the most efficient pumping wave length (8700 A.) of the crystal. It is desirable, of course, that the radiation wave length of the diodes be shifted without altering any of the other radiation characteristics. In particular, it is important that the half power-points of the shifted radiation spectra be maintained at about 100 A. apart.

Gallium arsenide and indium arsenide have closely similar band structures, i.e., both are direct semiconductive materials. There is complete solubility of one compound in the other over the entire composition range. Accordingly, the properties of the mixed semiconductor $Ga_{1-x}In_xAs$ are intermediate those of the pure components gallium arsenide and indium arsenide which have bandgap energies of about 1.4 ev. and 0.4 ev., respectively. Of greatest importance is the fact that the bandgap, and hence the recombination radiation spectra, can be tailored to fill a particular prescription. Generally speaking, the bandgap of the mixed semiconductor decreases at the rate of about 0.01 ev./molar percent In as the composition changes from pure gallium arsenide to pure indium arsenide. Substantial coincidence may be achieved between the 8700 A. pumping band of the neodymium doped calcium tungstate crystal and the diode p-n junctions by introducing about 2% indium into the gallium arsenide material.

Another technique for obtaining the required coincidence involves the provision of an operating temperature higher than 77° K. The bandgap of gallium arsenide exhibits a negative temperature coefficient which, in the low temperature range, is somewhat less than $4 \times 10^{-4}$ ev./° C. The desired decrease of about 0.02 ev. in the diode radiation energy may be obtained by operating the gallium arsenide diodes in the temperature range from about 120° K. to about 150° K. However, the radiative efficiency of gallium arsenide diodes decreases with increasing temperature. Additionally, the line width of the energy increases with increasing temperature. It can be seen from the preceding specification that light amplification is achieved in the disclosed embodiment by the self-stimulated emission of the active ions of the host laser crystals excited directly into the lasing energy level by the radiation emitted from the forward-biased p-n junction diodes. As those skilled in the art will recognize, the structure disclosed herein may also be used as an amplifier by making the reflective layer at end 5 of crystal 1 partially reflective. Both effects detract from the advantage to be gained by tailoring the recombination radiation spectra of the diodes to match the desired lasing excitation spectra of the crystal.

Although the host material calcium tungstate was described in connection with the preferred embodiment, other host materials may also be used without substantially affecting the lasing excitation spectra of the neodymium doped crystal. These include $SrMoO_3$, $LaF_3$, $CaF_2$, and glass.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A solid-state coherent light source comprising
a solid-state semiconductive p-n junction, means for forward-biasing said junction to produce a spectra of electron-hole recombination radiation,
a solid-state laser crystal having a direct lasing excitation spectra corresponding to said recombination radiation spectra,
and means for positioning said junction relative to said crystal so that said recombination radiation impinges upon said laser.

2. A solid-state coherent light source comprising
a solid-state semiconductive p-n junction, means for forward-biasing said junction to produce a spectra of electron-hole recombination radiation,
a solid-state neodymium doped host crystal having a direct lasing excitation spectra corresponding to said recombination radiation spectra,
and means for positioning said junction relative to said crystal so as to irradiate said crystal with said recombination radiation.

3. A solid-state coherent light source as defined in claim 2 wherein said host crystal is calcium tungstate.

4. A solid-state coherent light source comprising
a gallium arsenide junction diode,
means for forward-biasing said junction diode to produce electron-hole recombination radiation,
a neodymium doped host crystal,
and means for positioning said diode relative to said crystal so that said recombination radiation impinges upon said crystal.

5. A solid-state coherent light source comprising
a solid-state semiconductive p-n junction,
means for forward-biasing said p-n junction to produce a spectra of electron-hole recombination radiation,
a solid-state neodymium doped crystal having a direct lasing excitation spectra corresponding to said recombination radiation spectra,
means for positioning said junction relative to said crystal so as to irradiate said crystal with said recombination radiation,
and means for maintaining said junction and said diode at a super cooled temperature.

6. A solid-state coherent light source as defined in claim 2 wherein said p-n junction is a doped mixture of gallium arsenide and indium arsenide.

7. In combination,
a solid-state semiconductive p-n junction,
means for forward-biasing said function to produce a spectra of electron-hole recombination radiation,
a solid-state laser crystal having a direct lasing excitation spectra corresponding to said recombination radiation spectra,
and means for attaching said junction to said crystal whereby said radiation impinges upon said crystal.

8. In combination,
a plurality of semiconductive p-n junctions,
means for individually forward-biasing said junctions to produce a spectra of electron-hole recombination radiation,
a neodymium doped host crystal having a direct lasing excitation spectra corresponding to said recombination radiation spectra,
and means for sealing said junctions to the surface of said crystal so that said radiation impinges upon said crystal.

9. In combination,
a zinc doped gallium arsenide diode,
a neodymium doped calcium tungstate crystal,
means for forward-biasing said diode to produce electrol-hole recombination radiation,
means for positioning said diode relative to said crystal so that said radiation impinges upon said crystal,
and means for maintaining said diode and said crystal at about 77° K.

10. In combination,
a rod of neodymium doped host crystal having a square cross section,
four blocks of doped gallium arsenide diodes, each block consisting of a plurality of diodes,
means for attaching each of said blocks to a respective surface of said crystal,
and means for forward-biasing each of said diodes of each of said blocks to produce electron-hole recombination radiation, said radiation impinging on the surface of said crystal adjacent said blocks.

References Cited by the Examiner

UNITED STATES PATENTS 3,102,201   8/1963   Braunstein et al. _____ 88—1

OTHER REFERENCES

Baugh et al.: "Cathodoluminescent Optical Maser Pumping," Journal of the Optical Society of America, vol. 52, No. 5, May 1962, page 602.

Johnson et al.: "Infrared Emission and Stimulated Emission of $Nd^{+3}$ in $CaWO_4$," Proc. of The IRE, vol. 49, No. 11, pp. 1704–1706.

Lax: "Cyclotron Resonance Maser," Advances in Quantum Electronics, J. Singer, Ed., published Dec. 18, 1961, pp. 465–477.

Ready et al.: "Optical Pumping of Masers Using Laser Output," Proc. of The IRE, vol. 50, No. 3, March 1962, pp. 329 and 330.

JEWELL H. PEDERSEN, *Primary Examiner.*

R. L. WIBERT, J. L. CHASKIN, *Assistant Examiners.*